(12) United States Patent
Tao et al.

(10) Patent No.: US 9,516,709 B2
(45) Date of Patent: Dec. 6, 2016

(54) DRIVER CIRCUIT BETWEEN FLUORESCENT BALLAST AND LED

(71) Applicant: KONINKLIJKE PHILIPS N.V., Eindhoven (NL)

(72) Inventors: Haimin Tao, Eindhoven (NL); William Peter Mechtildis Marie Jans, Born (NL)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 0 days.

(21) Appl. No.: 14/413,111

(22) PCT Filed: Jun. 28, 2013

(86) PCT No.: PCT/IB2013/055316
§ 371 (c)(1),
(2) Date: Jan. 6, 2015

(87) PCT Pub. No.: WO2014/009836
PCT Pub. Date: Jan. 16, 2014

(65) Prior Publication Data
US 2015/0181667 A1 Jun. 25, 2015

Related U.S. Application Data

(60) Provisional application No. 61/670,166, filed on Jul. 11, 2012.

(51) Int. Cl.
H05B 33/08 (2006.01)

(52) U.S. Cl.
CPC ...... *H05B 33/0815* (2013.01); *H05B 33/0818* (2013.01)

(58) Field of Classification Search
None
See application file for complete search history.

(56) References Cited

U.S. PATENT DOCUMENTS

| 5,404,080 A | * | 4/1995 | Quazi | H05B 41/2925 315/151 |
| 5,850,127 A | * | 12/1998 | Zhu | H05B 41/2988 315/224 |
| 7,852,017 B1 | * | 12/2010 | Melanson | H05B 33/0815 315/185 S |

(Continued)

FOREIGN PATENT DOCUMENTS

| EP | 2451248 A1 | 5/2012 |
| EP | 2469984 A2 | 6/2012 |

(Continued)

*Primary Examiner* — Crystal L Hammond

(57) ABSTRACT

A driver circuit includes: a rectifier for exchanging a first current signal having a first frequency with an active fluorescent ballast, and for supplying a second current signal to a load which includes at least one light emitting diode; a switch circuit coupled to or forming part of the rectifier and configured to control an amount of power supplied to the load; and a controller configured to control the switch circuit. The switching frequency of the switch circuit is less than or equal to twice the first frequency. The controller is configured to synchronize the switching frequency of the switch circuit and the switching frequency of the active electronic ballast, which is equal to the first frequency.

20 Claims, 9 Drawing Sheets

(56) References Cited

U.S. PATENT DOCUMENTS

| | | | |
|---|---|---|---|
| 2009/0091268 A1 | 4/2009 | Forssen et al. | |
| 2010/0102737 A1 | 4/2010 | Facchini | |
| 2010/0176733 A1* | 7/2010 | King | H05B 37/0245 |
| | | | 315/158 |
| 2011/0043136 A1 | 2/2011 | Radermacher | |
| 2011/0254465 A1 | 10/2011 | Chen | |
| 2012/0313538 A1* | 12/2012 | Kumar | H05B 41/2806 |
| | | | 315/200 R |
| 2013/0063037 A1* | 3/2013 | Cheng | H05B 41/2885 |
| | | | 315/200 R |
| 2013/0181627 A1* | 7/2013 | Kumar | H05B 41/3927 |
| | | | 315/201 |
| 2014/0021871 A1 | 1/2014 | Loef et al. | |
| 2014/0203716 A1* | 7/2014 | Tao | H05B 33/0803 |
| | | | 315/186 |
| 2016/0113076 A1* | 4/2016 | Davenport | H05B 33/0815 |
| | | | 315/201 |

FOREIGN PATENT DOCUMENTS

| | | |
|---|---|---|
| WO | 2008044120 A2 | 4/2008 |
| WO | 2012052875 A2 | 4/2012 |

* cited by examiner

DRIVER CIRCUIT BETWEEN FLUORESCENT BALLAST AND LED

CROSS-REFERENCE TO PRIOR APPLICATIONS

This application is the U.S. National Phase application under 35 U.S.C. §371 of International Application No. PCT/IB13/055316, filed on Jun. 28, 2013, which claims the benefit of U.S. Provisional Patent Application No. 61/670, 166, filed on Jul. 11, 2012. These applications are hereby incorporated by reference herein.

FIELD OF THE INVENTION

The invention relates to a driver circuit for driving a load, the load comprising at least one light emitting diode. The invention further relates to a device.

Examples of such a device are fluorescent ballasts and lamps and parts thereof.

BACKGROUND OF THE INVENTION

US 2010/0102737 A1 discloses a device for supplying power to light emitting diodes. This device is relatively inefficient and suffers from relatively large power losses.

SUMMARY OF THE INVENTION

It is an object of the invention to provide an improved driver circuit. It is a further object of the invention to provide an improved device.

According to a first aspect, a driver circuit is provided for driving a load, the load comprising at least one light emitting diode, the driver circuit comprising
a rectifier for exchanging a first current signal with a fluorescent ballast and for supplying a second current signal to the load,
a switch circuit coupled to or forming part of the rectifier for controlling an amount of power supplied to the load, and
a controller for controlling the switch circuit, a switching frequency of the switch circuit being equal to or lower than twice a frequency of the first current signal.

The fluorescent ballast comprises for example an active electronic ballast. The first current signal is an alternating-current (AC) current signal, and the second current signal is a direct-current (DC) current signal. The switch circuit controls the amount of power supplied to the load, for example by shunting the first and/or second current signals and/or parts thereof.

By having introduced the controller for controlling the switch circuit, which controller is arranged to define the switching frequency of the switch circuit as being equal to or lower than twice the frequency of the first current signal, compared to the device disclosed in US 2010/0102737 A1, power losses are reduced much, owing to the fact that in US 2010/0102737 A1 the switches are operated at a frequency much higher than the frequency of the first current signal. Further, compared to the device disclosed in US 2010/0102737 A1, a disadvantageous branch switch coupled serially to the load is avoided.

At least one light emitting diode comprises one or more light emitting diodes of whatever kind and in whatever combination.

An embodiment of the driver circuit is defined by the rectifier comprising a bridge, input terminals of the bridge being arranged to be coupled to output terminals of the fluorescent ballast, and output terminals of the bridge being arranged to be coupled to input terminals of the load. A rectifier bridge converts the AC current signal into the DC current signal in an advantageously symmetrical way.

An embodiment of the driver circuit is defined by the switch circuit comprising a switch, the bridge comprising four diode elements, and main contacts of the switch being coupled to the output terminals of the bridge. This embodiment of the driver circuit is advantageous in that its switch circuit only requires one switch. However, to avoid that a capacitor coupled in parallel to the load is discharged via this switch in case it is in a conducting state, a diode element needs to be added between the switch and the load, which diode element will increase a power loss of the driver circuit to a small extent. By increasing a conducting time of the switch and by decreasing a non-conducting time of the switch, the amount of power supplied to the load is decreased, and vice versa.

An embodiment of the driver circuit is defined by the switch circuit comprising first and second switches, the bridge comprising first and second diode elements and the first and second switches, a first input terminal of the bridge being coupled via the first diode element to a first output terminal of the bridge and being coupled via the second diode element to a second output terminal of the bridge, main contacts of the first switch being coupled to a second input terminal and the first output terminal of the bridge, and main contacts of the second switch being coupled to the second input terminal and the second output terminal of the bridge. This embodiment of the driver circuit is advantageous in that, compared to the previous embodiment, a power loss in the rectifier bridge is reduced. Both switches need to be controlled in an anti-phase way, to avoid that a capacitor coupled in parallel to the load is discharged via these switches in case they are in a conducting state simultaneously. By increasing a phase-shift between a control of the switches on the one hand and the first current signal on the other hand, the amount of power supplied to the load is decreased, and vice versa. Here, the parasitic diode of each switch plays an important role in that the two diode elements and the two parasitic diodes together represent a conventional rectifier bridge.

An embodiment of the driver circuit is defined by the switch circuit comprising first and second switches, the bridge comprising first and second diode elements and the first and second switches, a first input terminal of the bridge being coupled via the first diode element to a first output terminal of the bridge, a second input terminal of the bridge being coupled via the second diode element to the first output terminal of the bridge, main contacts of the first switch being coupled to the first input terminal and a second output terminal of the bridge, and main contacts of the second switch being coupled to the second input terminal and the second output terminal of the bridge. This embodiment of the driver circuit is advantageous in that, compared to the previous embodiment, both switches are at the same voltage level. Both switches may be controlled without a phase-shift being present between their controls, but to reduce an efficiency loss they should be controlled with a phase-shift being present between their controls. By increasing an overlap in time of their conducting states, the amount of power supplied to the load is decreased, and vice versa. Here, the parasitic diode of each switch plays again an important role.

An embodiment of the driver circuit is defined by the switch circuit comprising first and second switches, the bridge comprising four diode elements, first main contacts of the first and second switches being coupled to the input terminals of the bridge, and second main contacts of the first and second switches being coupled to each other. This embodiment of the driver circuit is relatively identical to the previous embodiment. Both switches are here controlled via one and the same control signal. In case the second main contacts of the first and second switches are coupled to ground, this embodiment and the previous embodiment function identically.

An embodiment of the driver circuit is defined by further comprising a detuning circuit for matching an output impedance of the fluorescent ballast and an input impedance of the rectifier. This embodiment of the driver circuit is advantageous in that the detuning circuit not only matches impedances but also filters switching signals and reduces electromagnetic interference.

An embodiment of the driver circuit is defined by the detuning circuit comprising an inductor with a first side coupled to a first input terminal of the rectifier and with a second side arranged to be coupled to an output terminal of the fluorescent ballast, and further comprising a capacitor with a first side coupled to the second side of the inductor and with a second side coupled to a second input terminal of the rectifier. In a minimum situation, only the inductor is present. To improve the situation, the capacitor is to be added, always at the side of the fluorescent ballast. This detuning circuit is relatively simple and low cost and robust.

An embodiment of the driver circuit is defined by further comprising a start-up circuit for increasing an impedance at an input terminal of the rectifier at start-up. This embodiment of the driver circuit is advantageous in that it improves a performance of the fluorescent ballast. The start-up circuit increases the impedance at the input terminal of the rectifier at start-up. Certain fluorescent ballasts such as certain active electronic ballasts prefer a relatively high impedance at their outputs to start-up. The start-up circuit may increase the impedance at the input terminal of the rectifier directly, or indirectly via the detuning circuit.

An embodiment of the driver circuit is defined by the start-up circuit comprising a parallel connection of a capacitor and a switch, a first side of the parallel connection being coupled to a first input terminal of the rectifier and a second side of the parallel connection being arranged to be coupled to an output terminal of the fluorescent ballast, the switch being in a non-conducting state at start-up and being brought into a conducting state after an elapse of a time-interval. The time-interval is for example determined by measuring an amplitude of a current signal flowing through the capacitor and comparing the measured amplitude with a threshold. As soon as the threshold is exceeded, the time-interval has elapsed. This start-up circuit is relatively simple and low cost and robust.

An embodiment of the driver circuit is defined by further comprising a current sensor for informing the controller about an amplitude of a current signal flowing through the load. This embodiment of the driver circuit is advantageous in that the feedback improves a performance of the driver circuit.

An embodiment of the driver circuit is defined by further comprising a voltage sensor for informing the controller about an amplitude of a voltage signal present across the load. This embodiment of the driver circuit is advantageous in that the feedback improves a performance of the driver circuit.

An embodiment of the driver circuit is defined by the fluorescent ballast being an active electronic ballast, the controller being arranged to synchronize the switching frequency of the switch circuit and a switching frequency of the active electronic ballast. This embodiment of the driver circuit is advantageous in that said synchronization, compared to non-synchronization, reduces interference. Especially when several loads each comprising one or more light emitting diodes are present in a room, the synchronization provides an important advantage. The frequency of the first current signal is equal to the switching frequency of the active electronic ballast. In a first case when the switch circuit consists of one switch or of two switches that are controlled via one and the same control signal, the switching frequency of each switch should be equal to twice the frequency of the first current signal, to get synchronization. In this first case, each switch is then controlled twice per period of the first current signal. In a second case when the switch circuit consists of two switches that are controlled via different control signals, the switching frequency of each switch should be equal to the frequency of the first current signal, to get synchronization. In this second case, each switch in then controlled once per period of the first current signal, whereby the two switches are being controlled individually per period.

An embodiment of the driver circuit is defined by further comprising a detector for informing the controller about a zero crossing in the first current signal. This detector can be relatively simple and low cost and robust.

A diode element for example comprises a diode or several diodes or a zener diode or a transistor or a part thereof. A switch for example comprises a bipolar transistor or a field effect transistor. The detuning circuit and the start-up circuit and the current sensor and the voltage sensor and the synchronization improve a performance of the driver circuit for the switching frequency of the switch circuit being equal to or lower than twice the frequency of the first current signal, but do not necessarily require this switching frequency of the switch circuit to be equal to or lower than twice the frequency of the first current signal.

According to a second aspect, a device is provided comprising the driver and further comprising the electronic ballast and/or the light emitting diode circuit.

An insight is that relatively high switching frequencies of switch circuits in driver circuits are to be avoided. A basic idea is that the switching frequency of the switch circuit should be equal to or lower than twice the frequency of the first current signal, when lower then for example at most 50% of the frequency of the first current signal, preferably at most 20% of the frequency of the first current signal, further preferably at most 10% of the frequency of the first current signal.

A problem to provide an improved driver circuit has been solved. A further advantage is that the driver circuit is relatively efficient and avoids a branch switch coupled serially to the load.

These and other aspects of the invention will be apparent from and elucidated with reference to the embodiments described hereinafter.

DETAILED DESCRIPTION OF EMBODIMENTS

Figure 1:
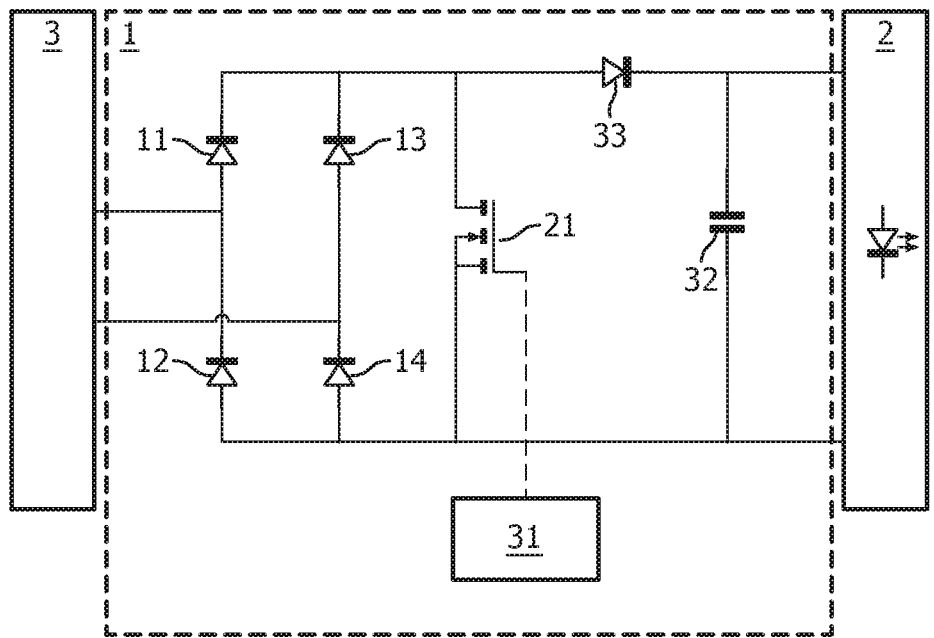
FIG. 1 shows a first embodiment of a driver circuit.

In the FIG. 1, a first embodiment of a driver circuit 1 for driving a load 2 is shown. The load 2 comprises one or more light emitting diodes of whatever kind and in whatever combination. The driver circuit 1 comprises a rectifier 11-14 for exchanging a first current signal with a fluorescent ballast 3 and for supplying a second current signal to the load 2. The rectifier 11-14 comprises a bridge. The bridge comprises four diode elements 11-14. Input terminals of the bridge are arranged to be coupled to output terminals of the fluorescent ballast 3, and output terminals of the bridge are arranged to be coupled to input terminals of the load 2. The driver circuit 1 further comprises a switch 21 for controlling an amount of power supplied to the load 2. Thereto, main contacts of the switch 21 are coupled to the output terminals of the bridge. The driver circuit 1 further comprises a controller 31 for controlling the switch 21 such that a switching frequency of the switch 21 is equal to or lower than twice a frequency of the first current signal.

For a fluorescent ballast 3 in the form of an active electronic ballast, a frequency of the first current signal could be 100 kHz or 40 kHz respectively, and a switching frequency of the switch 21 should be ≤200 kHz or ≤80 kHz respectively, for example 10 kHz or 4 kHz respectively, or 5 kHz or 1 kHz respectively etc.

A first main contact of the switch 21 is to be coupled via a diode element 33 to a first input terminal of the load 2, to avoid that a capacitor 32 coupled in parallel to the load 2 is discharged via the switch 21 in case it is in a conducting state. The capacitor 32 provides power to the load 2 during a conducting state of the switch 21, and is charged during a non-conducting state of the switch 21. The capacitor 32 further reduces a ripple of the second current signal. By increasing a conducting time of the switch 21 and by decreasing a non-conducting time of the switch 21, the amount of power supplied to the load 2 is decreased, and vice versa.

Figure 2:
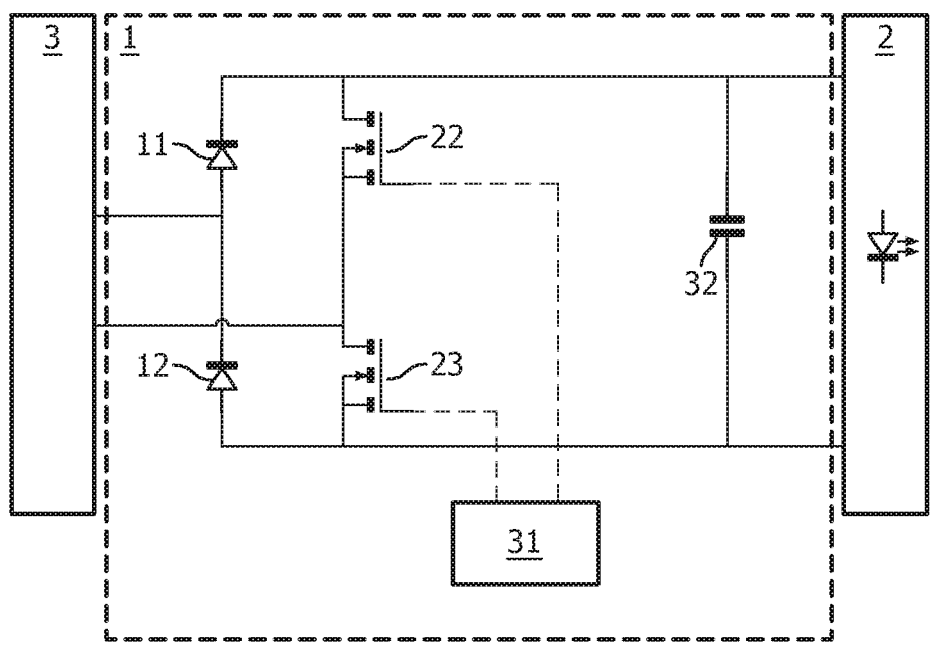
FIG. 2 shows a second embodiment of a driver circuit.

In the FIG. 2, a second embodiment of a driver circuit for driving a load 2 is shown. Here, the bridge comprises first and second diode elements 11, 12 and first and second switches 22, 23. A first input terminal of the bridge is coupled via the first diode element 11 to a first output terminal of the bridge and is coupled via the second diode element 12 to a second output terminal of the bridge. Main contacts of the first switch 22 are coupled to a second input terminal and the first output terminal of the bridge. Main contacts of the second switch 23 are coupled to the second input terminal and the second output terminal of the bridge. The driver circuit 1 further comprises a controller 31 for controlling the switches 22, 23 such that a switching frequency of each one of the switches 22, 23 is equal to or lower than a frequency of the first current signal.

Both switches 22, 23 need to be controlled in an anti-phase way, to avoid that the capacitor 32 coupled in parallel to the load 2 is discharged via these switches 22, 23 in case they would be in a conducting state simultaneously. By increasing a phase-shift between a control of the switches 22, 23 on the one hand and the first current signal on the other hand, the amount of power supplied to the load 2 is decreased, and vice versa. Here, the parasitic diode of each switch 22, 23 plays an important role in that the two diode elements 11, 12 and the two parasitic diodes together represent a conventional rectifier bridge.

Figure 3:
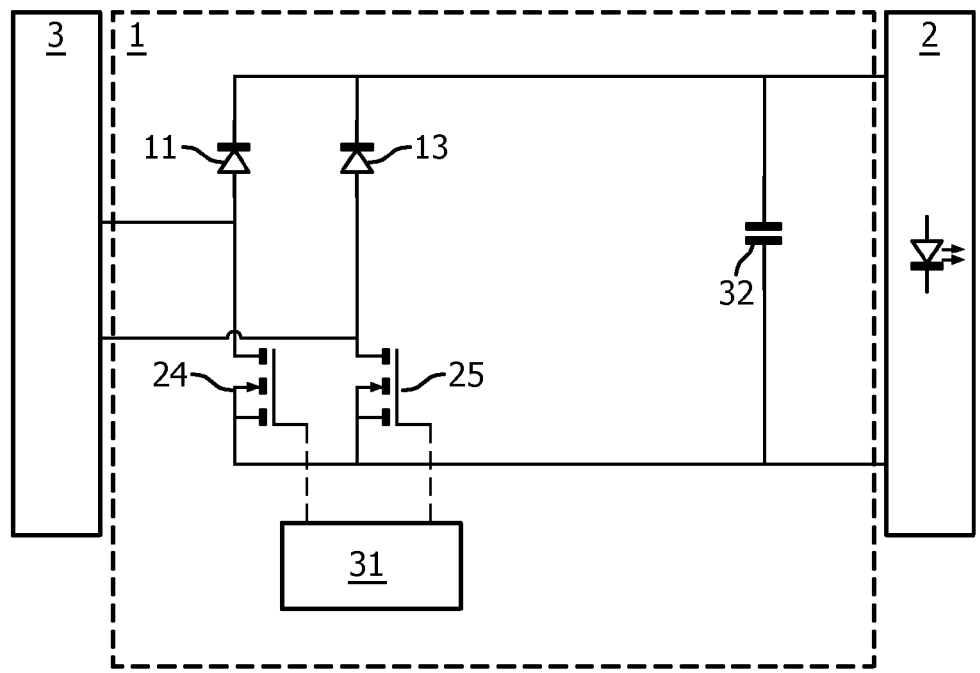
FIG. 3 shows a third embodiment of a driver circuit.

In the FIG. 3, a third embodiment of a driver circuit for driving a load 2 is shown. Here, the bridge comprises first and second diode elements 11, 13 and first and second switches 24, 25. A first input terminal of the bridge is coupled via the first diode element 11 to a first output terminal of the bridge. A second input terminal of the bridge is coupled via the second diode element 13 to the first output terminal of the bridge. Main contacts of the first switch 24 are coupled to the first input terminal and a second output terminal of the bridge. Main contacts of the second switch 25 are coupled to the second input terminal and the second output terminal of the bridge. The controller 31 controls the switches 24, 25 such that a switching frequency of each one of the switches 24, 25 is equal to or lower than a frequency of the first current signal.

Compared to the second embodiment, in the third embodiment both switches 24, 25 are at the same voltage level. Both switches 24, 25 may be controlled without a phase-shift being present between their controls, but to reduce an efficiency loss they should be controlled with a phase-shift being present between their controls. By increasing an overlap in time of their conducting states, the amount of power supplied to the load 2 is decreased, and vice versa. Here, the parasitic diode of each switch 24, 25 plays again an important role in that the two diode elements 11, 13 and the two parasitic diodes together represent a conventional rectifier bridge.

Figure 4:
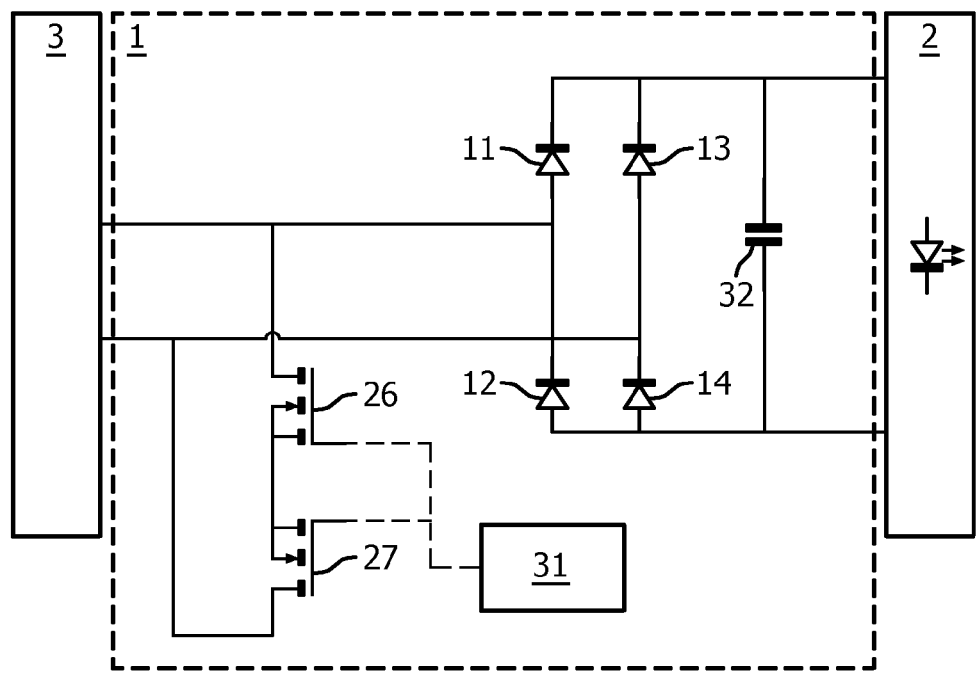
FIG. 4 shows a fourth embodiment of a driver circuit.

In the FIG. 4, a fourth embodiment of a driver circuit for driving a load 2 is shown. Here, the bridge comprises four diode elements 11-14. The driver circuit 1 comprises first and second switches 26, 27. First main contacts of the first and second switches 26, 27 are coupled to the input terminals of the bridge. Second main contacts of the first and second switches 26, 27 are coupled to each other.

Both switches 26, 27 are here controlled via one and the same control signal. In case the second main contacts of the first and second switches 26, 27 are coupled to ground, just like the anodes of the diode elements 12, 14, this fourth embodiment and the third embodiment function identically. However, here the controller 31 controls the switches 26, 27 such that a switching frequency of each one of the switches 26, 27 is equal to or lower than twice a frequency of the first current signal.

Figure 5:
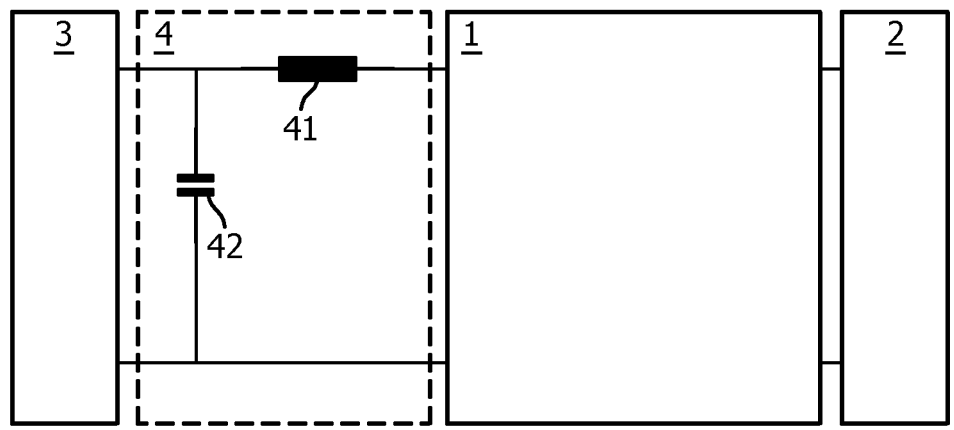
FIG. 5 shows a detuning circuit.

In the FIG. 5, a detuning circuit 4 for matching an output impedance of the fluorescent ballast 3 and an input impedance of the rectifier is shown. Here, the detuning circuit 4 is shown as a separate circuit between the fluorescent ballast 3 and the driver circuit 1, but it may alternatively form part of the fluorescent ballast 3 or the driver circuit 1. Preferably, the detuning circuit 4 comprises an inductor 41 with a first side coupled to a first input terminal of the rectifier and with a second side arranged to be coupled to an output terminal of the fluorescent ballast 3, and may further comprises a capacitor 42 with a first side coupled to the second side of the inductor 41 and with a second side coupled to a second input terminal of the rectifier.

Figure 6:
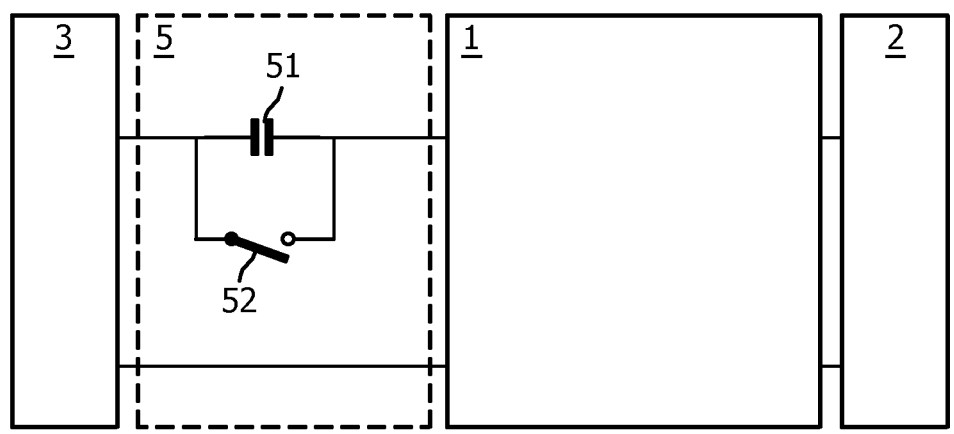
FIG. 6 shows a start-up circuit.

In the FIG. 6, a start-up circuit 5 for increasing an impedance at an input terminal of the rectifier at start-up is shown. Here, the start-up circuit 5 is shown as a separate circuit between the fluorescent ballast 3 and the driver circuit 1, but it may alternatively form part of the fluorescent ballast 3 or the driver circuit 1. Preferably, the start-up circuit 5 comprises a parallel connection of a capacitor 51 and a switch 52. A first side of the parallel connection is coupled to a first input terminal of the rectifier and a second side of the parallel connection is arranged to be coupled to an output terminal of the fluorescent ballast 3. The switch 52 is in a non-conducting state at start-up and is brought into a conducting state after an elapse of a time-interval. The time-interval is for example determined by measuring an amplitude of a current signal flowing through the capacitor 51 and comparing the measured amplitude with a threshold. As soon as the threshold is exceeded, the time-interval has elapsed and the switch is brought into a conducting state.

In case the detuning circuit 4 and the start-up circuit 5 are used in combination, usually input terminals of the start-up circuit 5 are to be coupled to output terminals of the fluorescent ballast 3 and output terminals of the start-up circuit 5 are to be coupled to input terminals of the detuning circuit 4 and output terminals of the detuning circuit 4 are to be coupled to input terminals of the driver circuit 1.

Figure 7:
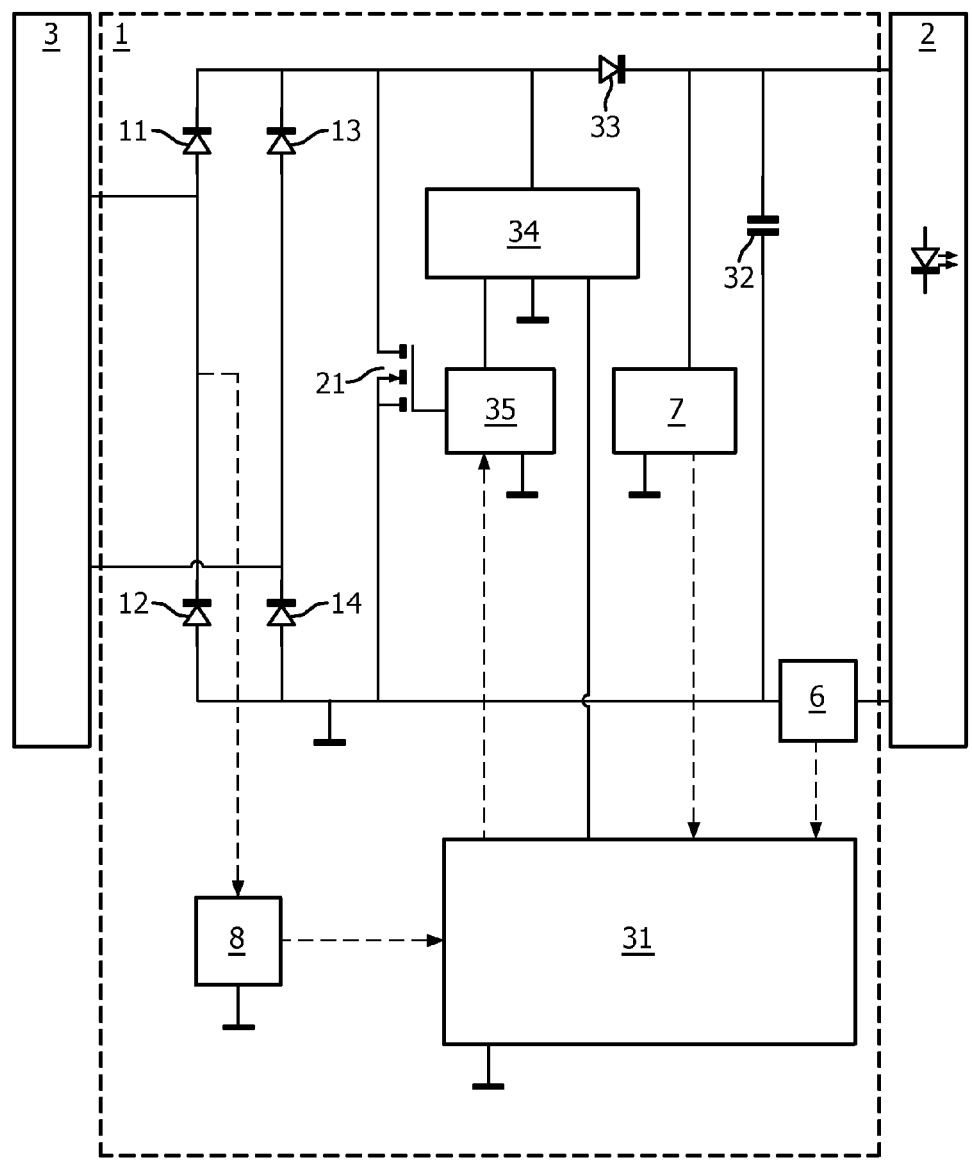
FIG. 7 shows a fifth embodiment of a driver circuit.

In the FIG. 7, a fifth embodiment of a driver circuit 1 is shown. This fifth embodiment is based on the first embodiment shown in the FIG. 1, that has been extended with:

A) A current sensor 6 for informing the controller 31 about an amplitude of a current signal flowing through the load 2. A simple embodiment of such a current sensor 6 is a resistor. The voltage signal present across the resistor represents and gives an indication of the current signal flowing through the resistor, and, in case the resistor and the load 2 are coupled serially, of the current signal flowing through the load 2. Other embodiments of the current sensor 6 are not to be excluded.

B) A voltage sensor 7 for informing the controller 31 about an amplitude of a voltage signal present across the load 2. A simple embodiment of such a voltage sensor 7 is a serial connection of two resistors, the serial connection being connected in parallel to the load 2. The voltage signal present across one of the two resistors (usually the one that is grounded) represents and gives an indication of the voltage signal present across the serial connection, and, in case the serial connection and the load 2 are coupled in parallel, of the voltage signal present across the load 2. Other embodiments of the voltage sensor 7 are not to be excluded.

C) A synchronization of the switching frequency of the switch 21 and the switching frequency of the fluorescent ballast 3 in the form of an active electronic ballast. Usually, the controller 31 will take care of such a synchronization, for example in response to information coming from a detector 8 for informing the controller 31 about a zero crossing in the first current signal.

D) A power supply 34 for supplying the controller 31. Thereto, the power supply 34 derives a relatively stable voltage from the cathodes of the diode elements 11, 13.

E) A gate driver 35 for driving the gate of the switch 21. Thereto, the gate driver 35 is powered via the power supply 34 and is informed via the controller 31.

The features A), B), C), D) and E) may further be introduced into the second, third and fourth embodiments.

Figure 8:
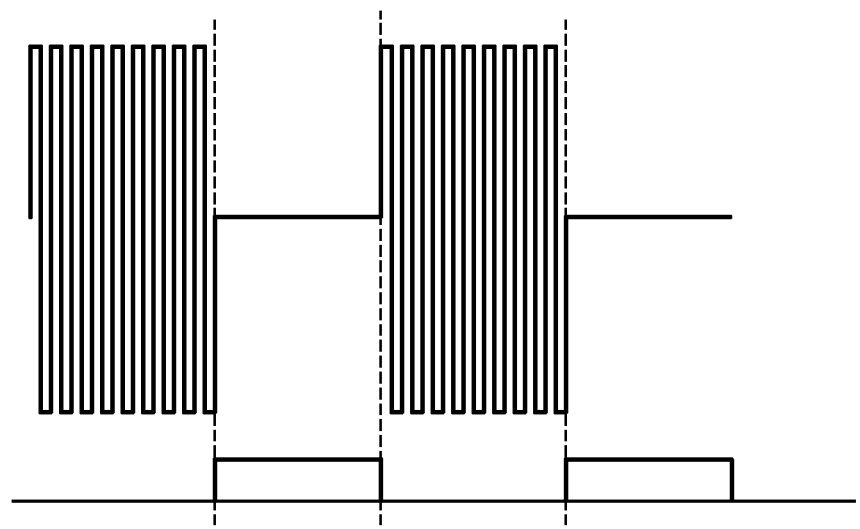
FIG. 8 shows first signals.

In the FIG. 8, first signals are shown. The upper signal shows an input voltage signal present across an input of the driver circuit 1 and the lower signal shows a control signal for the switch 21. When the switch 21 is in a conducting state, the input voltage signal is zero, owing to the fact that the second current signal is shunted. When the switch 21 is in a non-conducting state, the input voltage signal is a switched signal at the switching frequency of the fluorescent ballast. Clearly, this switching frequency of the fluorescent ballast is much higher than half the switching frequency of the switch 21.

Figure 9:
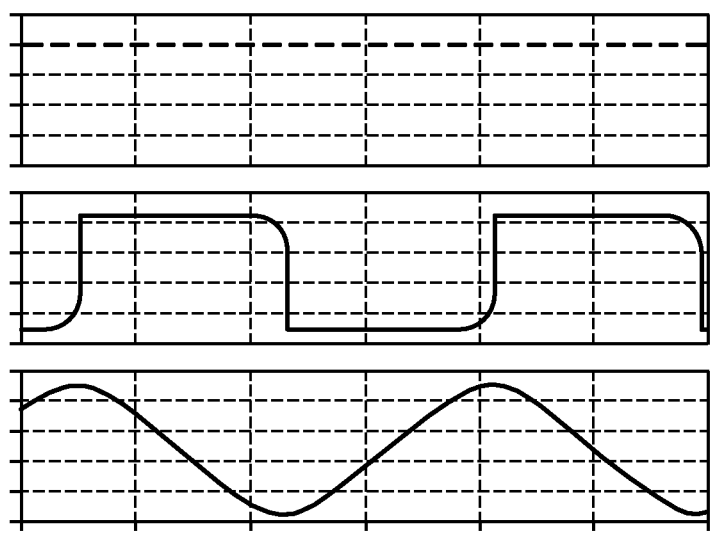
FIG. 9 shows first waveforms.

In the FIG. 9, first waveforms are shown, for the switch 21 being in a conducting state, switching frequency of the switch 21 being 1 kHz, duty cycle 0.5. Upper waveform: Control voltage signal for the switch 21. Middle waveform: Voltage signal at a middle terminal of the rectifier. Lower waveform: First current signal.

Figure 10:
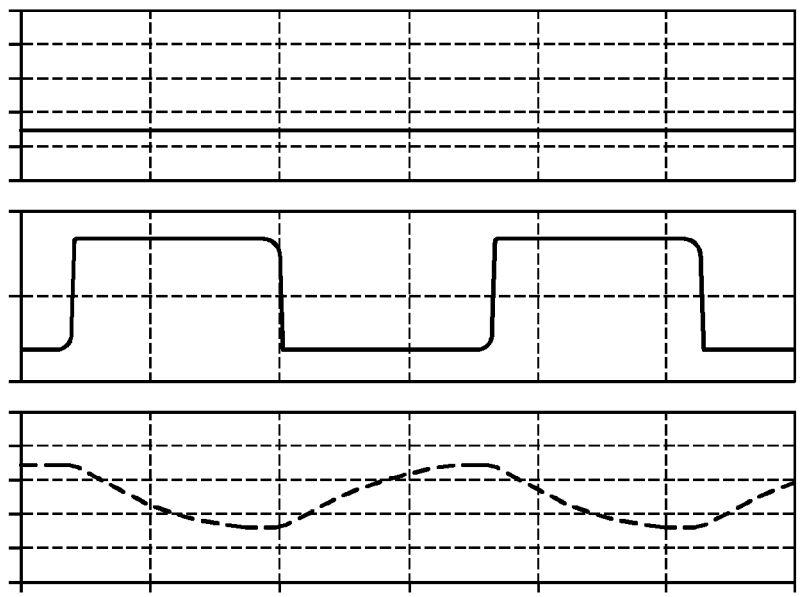
FIG. 10 shows second waveforms.

In the FIG. 10, second waveforms are shown, for the switch 21 being in a non-conducting state, switching frequency of the switch 21 being 1 kHz, duty cycle 0.5. Upper waveform: Control voltage signal for the switch 21. Middle waveform: Voltage signal at a middle terminal of the rectifier. Lower waveform: First current signal.

Figure 11:
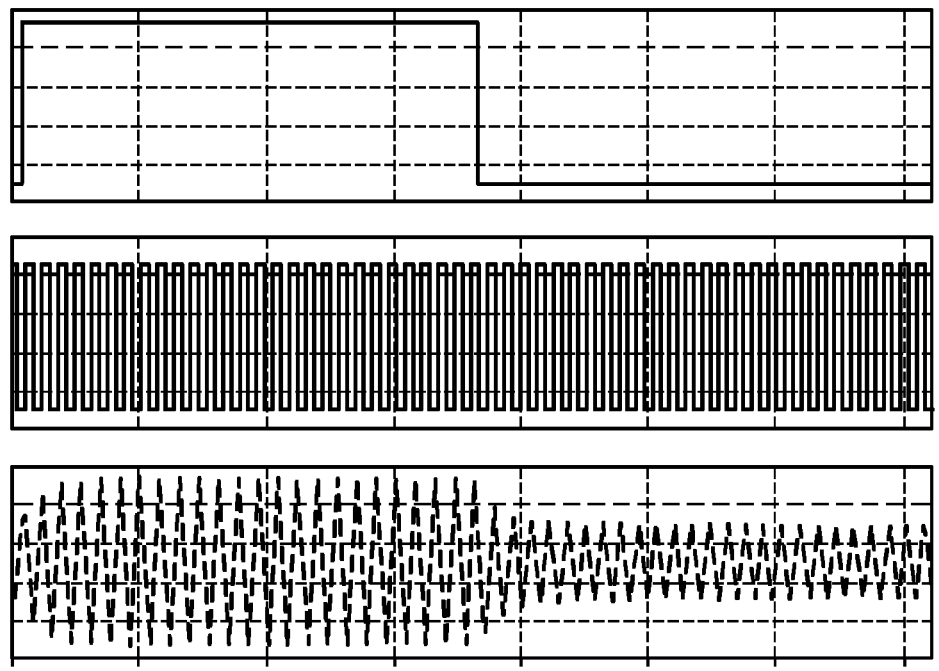
FIG. 11 shows third waveforms.

In the FIG. 11, third waveforms are shown, for the switch 21 going from a conducting state to in a non-conducting state, switching frequency of the switch 21 being 1 kHz, duty cycle 0.5. Upper waveform: Control voltage signal for the switch 21. Middle waveform: Voltage signal at a middle terminal of the rectifier. Lower waveform: First current signal.

Figure 12:
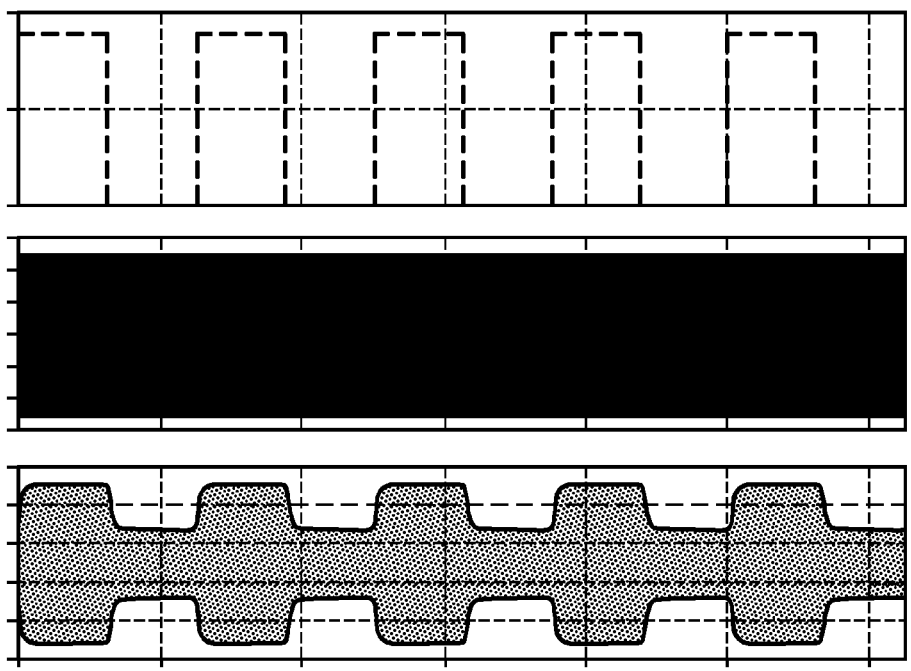
FIG. 12 shows fourth waveforms.

In the FIG. 12, fourth waveforms are shown, for the switch 21 going from a conducting state to in a non-conducting state, switching frequency of the switch 21 being 1 kHz, duty cycle 0.5, but now for an enlarged time scale. Upper waveform: Control voltage signal for the switch 21. Middle waveform: Voltage signal at a middle terminal of the rectifier. Lower waveform: First current signal.

Figure 13:
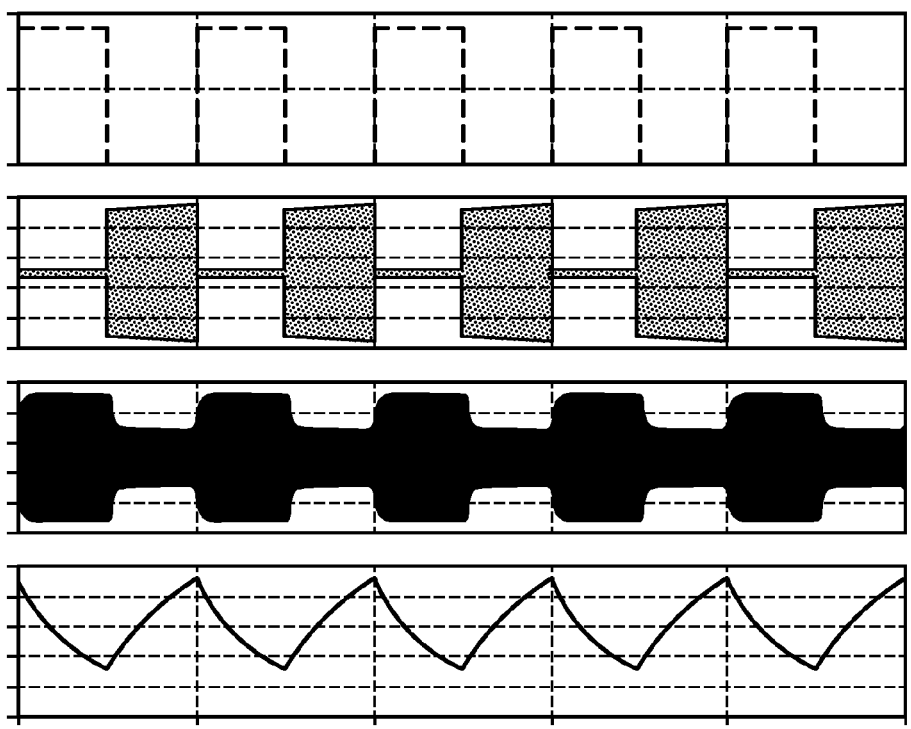
FIG. 13 shows fifth waveforms.

In the FIG. 13, fifth waveforms are shown, for the switch 21 having a switching frequency of 1 kHz, duty cycle 0.5. Upper waveform: Control voltage signal for the switch 21. Second waveform: Voltage signal present across an input of the driver circuit 1. Third waveform: First current signal. Lower waveform: Current signal flowing through the load 2.

Figure 14:
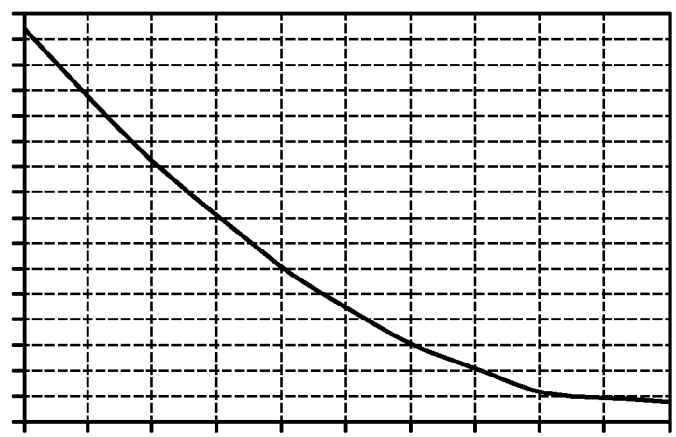
FIG. 14 shows a power versus duty cycle graph.

In the FIG. 14, a power versus duty cycle graph is shown. For an increasing duty cycle of the switch 21, the amount of power supplied to the load 2 is reduced.

Figure 15:
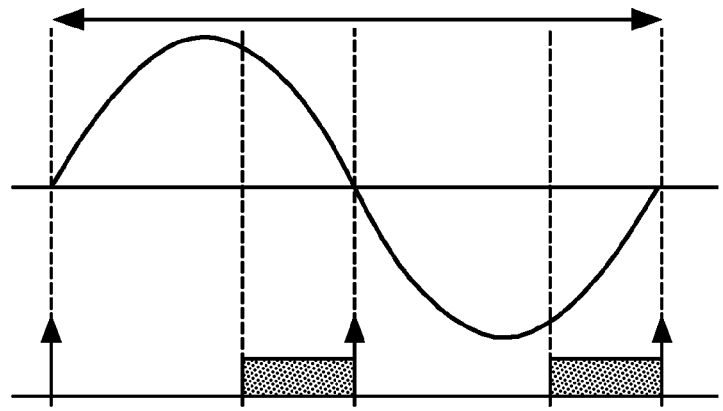
FIG. 15 shows second signals.
Figure 15:
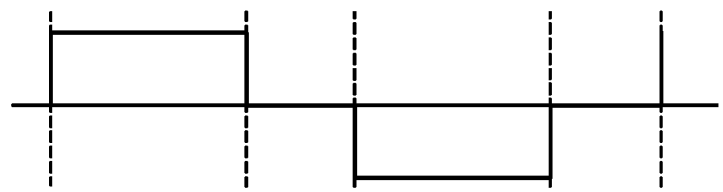

In the FIG. 15, second signals are shown, for the switch 21 having a switching frequency that is synchronized with the switching frequency of the fluorescent ballast (in an inductive way). The upper signal shows one high-frequency cycle of the first current signal that flows through an input of the driver circuit 1. The middle signal shows a control signal for the switch 21. The lower signal shows a voltage signal present across the input of the driver circuit 1. Clearly, here the switching frequency of the switch 21 is equal to twice the switching frequency of the fluorescent ballast.

Figure 16:
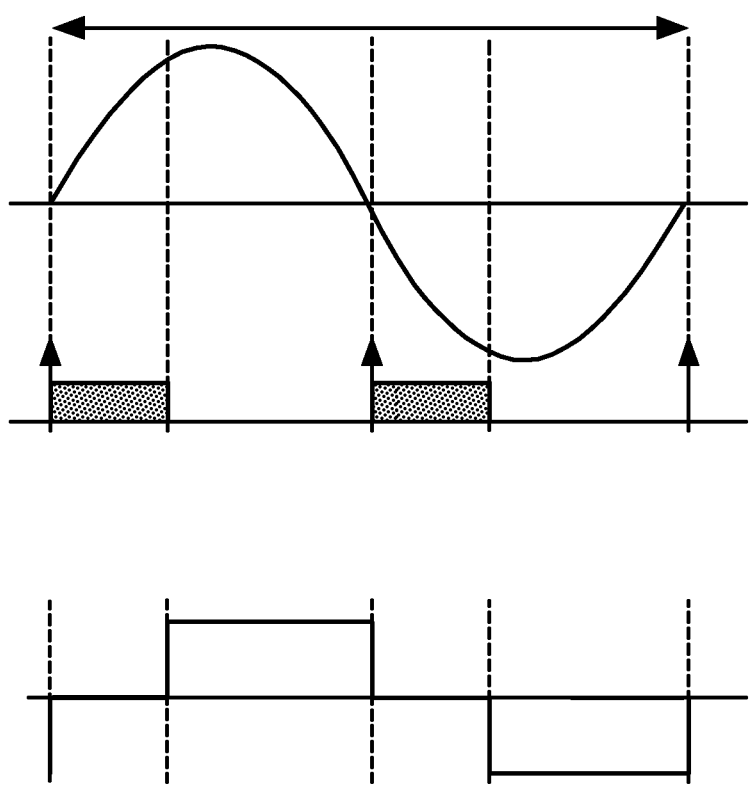
FIG. 16 shows third signals.

In the FIG. 16, third signals are shown, for the switch 21 having a switching frequency that is synchronized with the switching frequency of the fluorescent ballast (in a capacitive way). The upper signal shows one high-frequency cycle of the first current signal that flows through an input of the driver circuit 1. The middle signal shows a control signal for the switch 21. The lower signal shows a voltage signal present across the input of the driver circuit 1. Again, here the switching frequency of the switch 21 is equal to twice the switching frequency of the fluorescent ballast.

Similar signals and waveforms and graphs may be produced for the second, third and fourth embodiments.

Summarizing, driver circuits 1 for driving loads 2 comprising light emitting diodes are provided with rectifiers 11-14 for exchanging first current signals with fluorescent ballasts 3 such as active electronic ballasts and for supplying second current signals to the loads 2, with switch circuits 21-27 coupled to or forming part of the rectifiers 11-14 for controlling amounts of power supplied to the loads 2, and with controllers 31 for controlling the switch circuits 21-27 such that switching frequencies of the switch circuits 21-27 are equal to or lower than twice the frequencies of the first current signals. Detuning circuits 4 match output impedances of the fluorescent ballasts 3 and input impedances of the rectifiers 11-14. Start-up circuits 5 increase impedances at input terminals of the rectifiers 11-14 at start-up. Current sensors 6 and voltage sensors 7 provide feedback. The controllers 31 synchronize the switching frequencies of the switch circuits 21-27 and switching frequencies of the active electronic ballasts. Detectors 8 detect zero crossings in the first current signals.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver circuit for driving a load, the load comprising at least one light emitting diode, the driver circuit comprising
    a rectifier for exchanging a first current signal with a fluorescent ballast and for supplying a second current signal to the load,
    a switch circuit coupled to or forming part of the rectifier configured to control an amount of power supplied to the load, and
    a controller configured to control the switch circuit, a switching frequency of the switch circuit being equal to or lower than twice a frequency of the first current signal,
    the fluorescent ballast comprising an active electronic ballast, the controller configured to synchronize the switching frequency of the switch circuit and a switching frequency of the active electronic ballast that is equal to the frequency of the first current signal.

2. The driver circuit as defined in claim 1, the rectifier comprising a bridge, input terminals of the bridge being arranged to be coupled to output terminals of the fluorescent ballast, and output terminals of the bridge being arranged to be coupled to input terminals of the load.

3. The driver circuit as defined in claim 2, the switch circuit comprising a switch the bridge comprising four diode elements, and main contacts of the switch being coupled to the output terminals of the bridge.

4. The driver circuit as defined in claim 2, the switch circuit comprising first and second switches, the bridge comprising first and second diode elements and the first and second switches, a first input terminal of the bridge being coupled via the first diode element to a first output terminal of the bridge and being coupled via the second diode element to a second output terminal of the bridge, main contacts of the first switch being coupled to a second input terminal and the first output terminal of the bridge, and main contacts of the second switch being coupled to the second input terminal and the second output terminal of the bridge.

5. The driver circuit as defined in claim 2, the switch circuit comprising first and second switches, the bridge comprising first and second diode elements and the first and second switches, a first input terminal of the bridge being coupled via the first diode element to a first output terminal of the bridge, a second input terminal of the bridge being coupled via the second diode element to the first output terminal of the bridge, main contacts of the first switch being coupled to the first input terminal and a second output terminal of the bridge, and main contacts of the second switch being coupled to the second input terminal and the second output terminal of the bridge.

6. The driver circuit as defined in claim 2, the switch circuit comprising first and second switches, the bridge comprising four diode elements, first main contacts of the first and second switches being coupled to the input terminals of the bridge, and second main contacts of the first and second switches being coupled to each other.

7. The driver circuit as defined in claim 1, further comprising a detuning circuit for matching an output impedance of the fluorescent ballast and an input impedance of the rectifier.

8. The driver circuit as defined in claim 7, the detuning circuit comprising an inductor with a first side coupled to a first input terminal of the rectifier and with a second side arranged to be coupled to an output terminal of the fluorescent ballast, and further comprising a capacitor with a first side coupled to the second side of the inductor and with a second side coupled to a second input terminal of the rectifier.

9. The driver circuit as defined in claim 1, further comprising a start-up circuit for increasing an impedance at an input terminal of the rectifier at start-up.

10. The driver circuit as defined in claim 9, the start-up circuit comprising a parallel connection of a capacitor and a switch, a first side of the parallel connection being coupled to a first input terminal of the rectifier and a second side of the parallel connection being arranged to be coupled to an output terminal of the fluorescent ballast, the switch being in a non-conducting state at start-up and being brought into a conducting state after an elapse of a time-interval.

11. The driver circuit as defined in claim 1, further comprising a current sensor for informing the controller about an amplitude of the second current signal flowing through the load.

12. The driver circuit as defined in claim 1, further comprising a voltage sensor for informing the controller about an amplitude of a voltage signal present across the load.

13. The driver circuit as defined in claim 1, the switch circuit comprising one switch or two switches that are controlled via one and the same control signal, the switching frequency of each switch being equal to twice the frequency of the first current signal.

14. The driver circuit as defined in claim 13, further comprising a detector for informing the controller about a zero crossing in the first current signal.

15. The driver circuit as defined in claim 1, the switch circuit comprising two switches that are controlled via different control signals, the switching frequency of each switch being equal to the frequency of the first current signal.

16. A device, comprising:
a rectifier having input terminals configured to be connected with output terminals of an active electronic fluorescent ballast and to receive from the active electronic fluorescent ballast a first current having a first frequency equal to a switching frequency of the active electronic ballast, and having output terminals configured to supply a second current signal to a load including at least one light emitting diode (LED);
a switch circuit coupled to or forming part of the rectifier and configured to be switched at a switching frequency to control an amount of power supplied to the load; and
a controller configured to control the switch circuit so that the switching frequency of the switch circuit is no greater than twice the switching frequency of the active electronic ballast, and to synchronize the switching frequency of the switch circuit to the switching frequency of the active electronic ballast.

17. The device of claim 16, further comprising the active electronic fluorescent ballast having its output terminals connected to the input terminals of the rectifier.

18. The device of claim 16, further comprising the load including the at least one LED.

19. A method, comprising:
a rectifier receiving from output terminals of an active electronic fluorescent ballast a first current having a first frequency equal to a switching frequency of the active electronic ballast;
the rectifier supplying a second current signal to a load including at least one light emitting diode (LED);
switching a switch circuit coupled to or forming part of the rectifier at a switching frequency to control an amount of power supplied to the load; and
controlling the switch circuit so that the switching frequency of the switch circuit is no greater than twice the switching frequency of the active electronic ballast, and synchronizing the switching frequency of the switch circuit to the switching frequency of the active electronic ballast.

20. The method of claim 19, wherein the switch circuit comprises two switches, the method further comprising controlling the two switches via different control signals such that the switching frequency of each switch is equal to the frequency of the switching frequency of the active electronic ballast.

* * * * *